United States Patent [19]

Klier et al.

[11] Patent Number: 4,719,902
[45] Date of Patent: Jan. 19, 1988

[54] LIGHT TRANSMISSIVE INSULATION APPARATUS

[75] Inventors: Shimon Klier, Simtat Magal 4, Savyon; Ofer Novik, Rehovot, both of Israel

[73] Assignee: Shimon Klier, Savyon, Israel

[21] Appl. No.: 839,967

[22] Filed: Mar. 17, 1986

Related U.S. Application Data

[63] Continuation-in-part of Ser. No. 800,915, Nov. 25, 1985, which is a continuation of Ser. No. 541,119, Oct. 12, 1983, abandoned, which is a continuation-in-part of Ser. No. 363,451, Mar. 30, 1982, Pat. No. 4,480,632.

[51] Int. Cl.⁴ ................................................ F24J 2/42
[52] U.S. Cl. ................................. 126/415; 126/441
[58] Field of Search ............... 126/415, 426, 439, 441; 4/498–502; 202/234; 203/DIG. 1

[56] References Cited

U.S. PATENT DOCUMENTS

| | | | |
|---|---|---|---|
| 3,015,613 | 1/1962 | Edmondson | 203/DIG. 1 |
| 4,326,498 | 4/1982 | Eckland | 126/415 |
| 4,334,524 | 6/1982 | McCullough et al. | 126/441 |
| 4,350,143 | 9/1982 | Laing et al. | 126/415 |
| 4,480,632 | 11/1984 | Klier et al. | |

FOREIGN PATENT DOCUMENTS 2545297  4/1977  Fed. Rep. of Germany ...... 126/441

OTHER PUBLICATIONS

Design Considerations for Cellular Solar Collectors, by D. K. Edwards, H. Buchberg, O. Lalude, ASME 68—WA/SOL-3.

Primary Examiner—James C. Yeung
Assistant Examiner—Noah Kamen
Attorney, Agent, or Firm—Cushman, Darby & Cushman

[57] ABSTRACT

A light transmissive insulation system comprising a plurality of layers of light transmissive insulating material, the material being characterized by transmissivity to solar spectrum radiation, and low transmissivity to thermal radiation. A solar pond employing the insulation system is also described.

2 Claims, 28 Drawing Figures

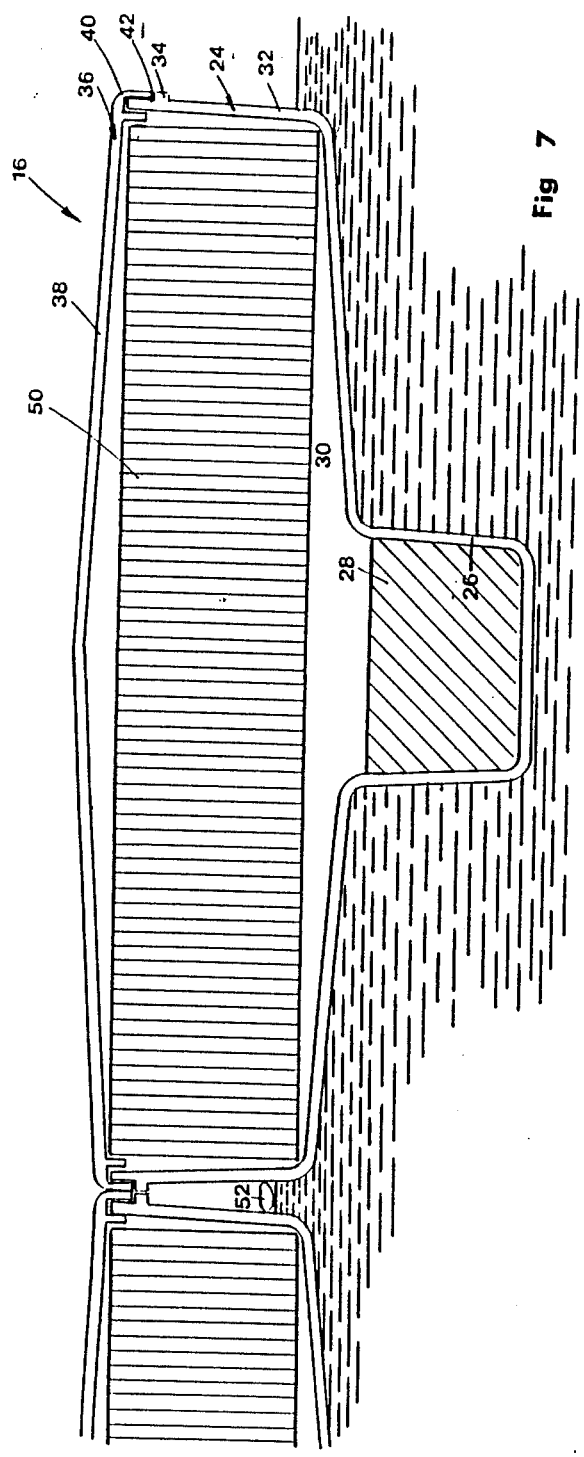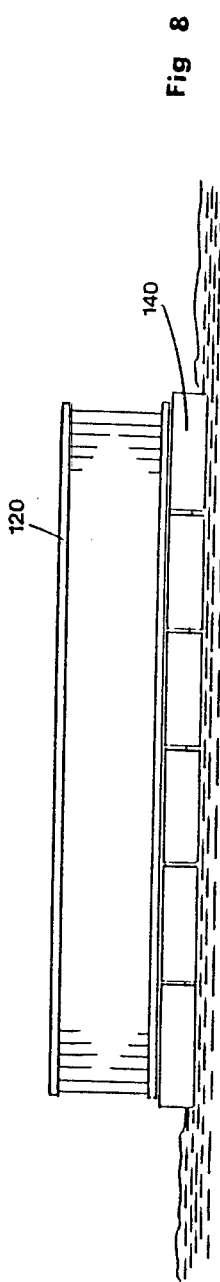

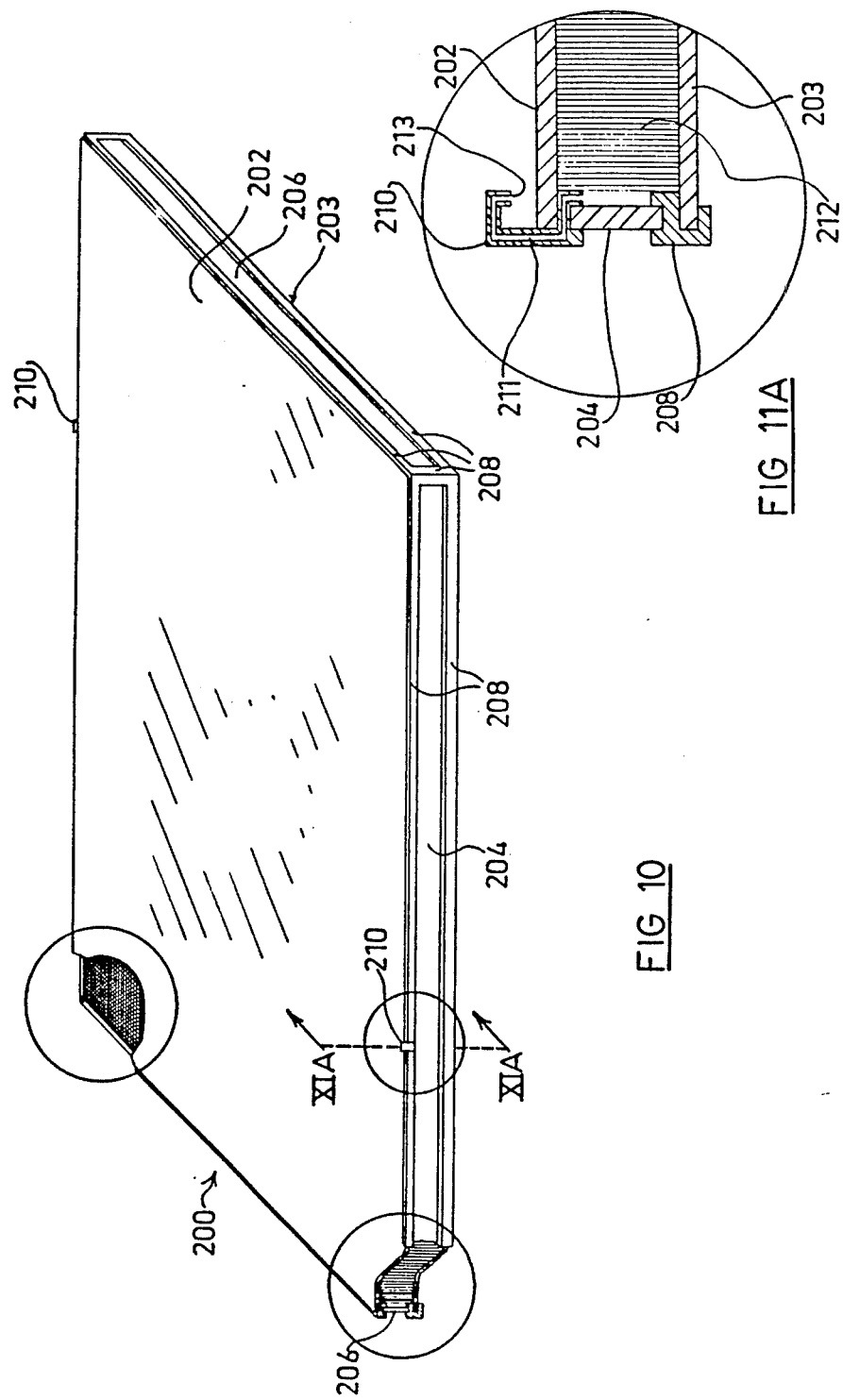

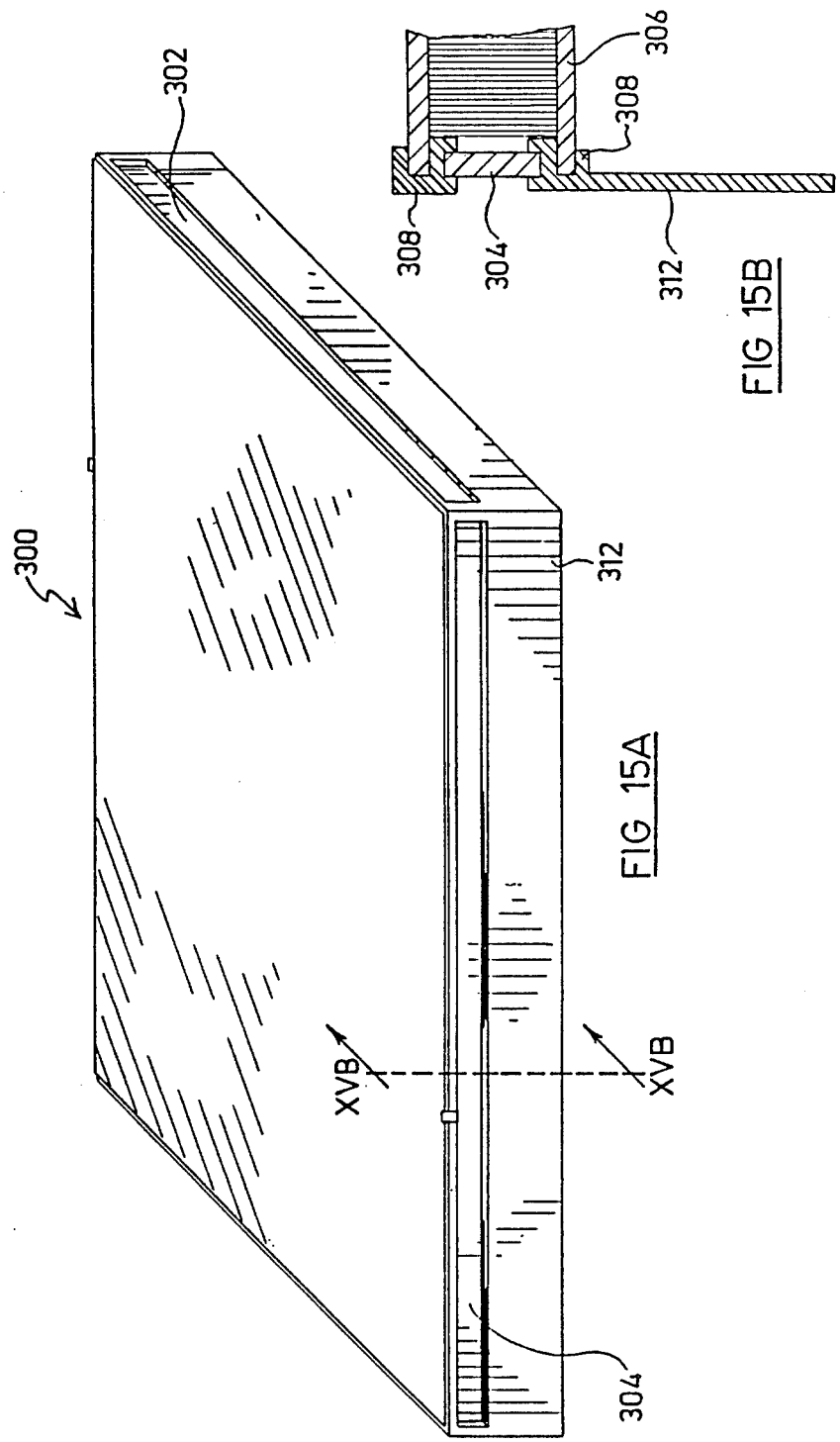

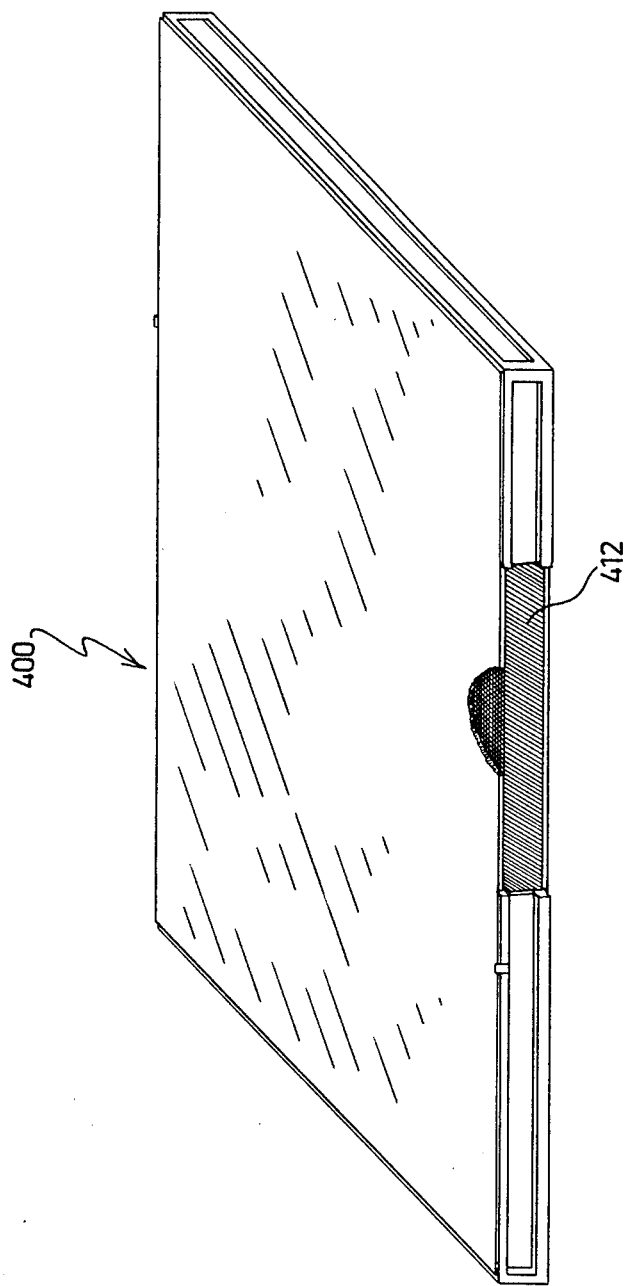

LIGHT TRANSMISSIVE INSULATION APPARATUS

REFERENCE TO CO-PENDING APPLICATIONS

This application is a continuation-in-part of U.S. patent application Ser. No. 800,915 filed Nov. 25, 1985. U.S. patent application Ser. No. 800,915 is a continuation of U.S. patent application Ser. No. 541,119 filed Oct. 12, 1983 now abandoned. U.S. patent application Ser. No. 541,119 is a continuation-in-part of U.S. patent application Ser. No. 363,451, filed Mar. 30, 1982, now U.S. Pat. No. 4,480,632.

FIELD OF THE INVENTION

The present invention relates to insulation generally and more particularly to insulation apparatus and structures which are substantially light transmissive and are suitable for use with solar ponds including defining portions of larger bodies such as lakes or seas.

BACKGROUND OF THE INVENTION

There is described and claimed in applicants' U.S. Pat. No. 4,480,632 thermal insulation suitable for use along a solar radiation incident surface of a solar pond containing a pond liquid and including a plurality of transparent enclosures arranged to be disposed on a surface of a solar pond, at least one layer of insulative beads disposed within those enclosures, the layer of insulative beads defining a plurality of barrier layers separated from each other by insulating volumes defined by the insulating beads, a liquid material of viscosity greater than the viscosity of the pond liquid being arranged to fill the interstices between the plurality of enclosures, the at least one layer of insulative beads definign the barrier layers being formed of a material selected from the following materials: glass, fluoroplastics, acrylics and polycarbonate and being characterized by transmissivity to solar radiation and opacity to thermal infro-red radiation in the wavelength range of 6–20 microns, the volumes defined by the insulative beads being characterized by low thermal conductivity and high transparency to solar radiation.

There is described and claimed in co-pending U.S. patent application Ser. No. 541,119 filed Oct. 12, 1983, solar radiation transmissive insulation apparaus comprising an array of adjacent cells having a geometrical configuration which limits free convection therethrough, the array being generally transparent to solar visible and infra-red radiation and generally opaque to thermal infro-red radiation and a solar pond employing such insulation.

SUMMARY OF THE INVENTION

The present invention represents a further refinement and development of the insulation apparatus and system described and claimed in applicant's aforesaid U.S. Pat. No. 4,480,632 and co-pending application Ser. No. 541,119.

In accordance with a preferred embodiment of the present invention, there is provided a solar pond comprising a body of material sought to be heated, a layer of solar spectrum radiation transmissive insulation arranged to lie over the body of material and in spaced relationship therewith, the layer of solar spectrum radiation transmissive insulation comprising an array of cells configured to minimize heat losses from the body of material through convection and conduction, said array being generally transmissive to solar spectrum radiation and generally opaque to thermal radiation.

According to an embodiment of the present invention, the array of cells comprises a plurality of elongated cells which when their longitudinal axis is vertical, are square in plan and rectangular in section.

According to an alternative embodiment of the present invention the array of cells comprises a plurality of elongated slanted cells.

According to an embodiment of the present invention, the pond material sought to be heated comprises any material substantially absorbent of solar spectrum radiation such that a layer of that material typically up to one meter in thickness when exposed to solar spectrum radiation will become sufficiently heated such that energy is usable therefrom.

Pond materials may comprise any appropriate organic or inorganic material or a suitable combination thereof.

Also according to the above embodiment of the present invention, the pond material may comprise at least two mutually immiscible materials comprising distinct layers wherein these layers may comprise a solid or a liquid.

It is also a feature of this embodiment of the invention that the uppermost layer may have a lower vapour pressure than any layers therebelow, in order substantially to prevent thermal energy loss by evaporation of the lower layers through the uppermost layer.

Examples of liquids that are suitable for use as an upper layer in the above-described embodiment of the invention wherein the lower layer substantially comprises water are film forming materials such as oil or cetyl alcohol.

It should be noted that in all preferred embodiments of the present invention the pond material comprises a liquid.

According to one embodiment of the invention, the solar spectrum radiation transmissive insulation is mounted on a fixed support secured to the floor of the body of liquid. According to an alternative embodiment of the invention, the solar spectrum radiation transmissive insulation is mounted on buoys floating on the body of liquid. According to a further alternative embodiment of the invention, the solar spectrum radiation transmissive insulation is mounted on elongate tubes floating on the body of liquid.

In accordance with one preferred embodiment of the invention, the solar spectrum radiation transmissive insulation is provided with a generally tilted top surface to provide rain runoff therefrom.

Additionally in accordance with an embodiment of the present invention there is provided a solar pond comprising a body of material sought to be heated, a layer of solar spectrum radiation transmissive insulation arranged to lie over the body of material, the layer of solar spectrum radiation transmissive insulation comprising an array of cells configured to minimize heat losses from the body of liquid through convection and conduction, said array being generally transmissive to solar spectrum radiation and generally opaque to thermal radiation, the array being surrounded by a generally sealed enclosure comprising planar glass panels defining top, bottom and side surfaces and being joined by sealing means, venting apparatus being provided for permitting communication between the interior and exterior of the enclosure.

According to an embodiment of the present invention, the array of cells comprises a plurality of elongated cells which when their longitudinal axis is vertical, are square in plan and rectangular in section.

According to an alternative embodiment of the present invention the array of cells comprises a plurality of elongated cells, which when their longitudinal axis is vertical, are square in plan and rhomboid in section.

As noted above, although pond materials may comprise any appropriate organic or inorganic material or any suitable combination thereof, in preferred embodiments of the present invention the pond material comprises a liquid.

In the above embodiment, the solar radiation transmissive insulation may be arranged in spaced relationship above the body of liquid or alternatively floating directly on the top surface of the body of liquid.

In one embodiment of the invention there are provided downwardly extending peripheral surfaces arranged to form a skirt below the enclosure whereby an air gap is defined by the bottom of the enclosure, the body of liquid and the skirt. In this embodiment there may also be provided means for the provision of air to the air gap for the regulation thereof.

In an alternative embodiment the enclosure is floating on the body of liquid and its bottom surface is preferably blackened.

Additionally in accordance with an embodiment of the invention, there is provided for use in a solar pond, comprising a body of material sought to be heated, a layer of solar spectrum radiation transmissive insulation arranged to lie over the body of material and in spaced relationship therewith, the layer of solar spectrum radiation transmissive insulation comprising an array of cells configured to minimize heat losses from the body of material through convection and conduction, said array being generally transmissive to solar spectrum radiation and generally opaque to thermal radiation.

According to an embodiment of the present invention, the array of cells comprises a plurality of elongated cells which when their longitudinal axis is vertical, are square in plan and rectangular in section.

According to an alternative embodiment of the present invention the array of cells comprises a plurality of elongated cells, which when their longitudinal axis is vertical, are square in plan and rhomboid in section.

As noted above, although pond materials may comprise any appropriate organic or inorganic material or any suitable combination thereof, in preferred embodiments of the present invention the pond material comprises a liquid.

According to one embodiment of the invention, the solar spectrum radiation transmissive insulation is mounted on a fixed support secured to the floor of the body of liquid. According to an alternative embodiment of the invention, the solar spectrum radiation transmissive insulation is mounted on buoys floating on the body of liquid. According to a further alternative embodiment of the invention, the solar spectrum radiation transmissive insulation is mounted on elongate tubes floating on the body of liquid.

In accordance with one preferred embodiment of the invention, the solar spectrum radiation transmissive insulation is provided with a generally tilted top surface to provide rain runoff therefrom.

Additionally in accordance with an embodiment of the present invention there is provided for use in a solar pond comprising a body of material sought to be heated, a layer of solar spectrum radiation transmissive insulation arranged to lie over the body of material, the layer of solar spectrum radiation transmissive insulation comprising an array of cells configured to minimize heat losses from the body of material through convection and conduction, said array being generally transmissive to solar spectrum radiation and generally opaque to thermal radiation, the array being surrounded by a generally sealed enclosure comprising planar glass panels defining top, bottom and side surfaces and being joined by sealed means, venting apparatus being provided for permitting communication between the interior and exterior of the enclosure.

According to an embodiment of the present invention, the array of cells comprises a plurality of elongated cells which when their longitudinal axis is vertical, are square in plan and rectangular in section.

According to an alternative embodiment of the present invention the array of cells comprises a plurality of elongated cells, which when their longitudinal axis is vertical, are square in plan and rhomboid in section.

As noted above, although pond materials may comprise any appropriate organic or inorganic material or any suitable combination thereof, in preferred embodiments of the present invention the pond material comprises a liquid.

According to the above embodiment, the solar spectrum radiation transmissive insulation may be arranged in spaced relationship above the body of liquid or alternatively directly floating on the top surface of the body of liquid.

In an additional embodiment of the invention there are provided downwardly extending peripheral surfaces arranged to form a skirt below the enclosure whereby an air gap is defined by the bottom of the enclosure, the body of liquid and the skirt. In this embodiment there may also be provided means for the provision of air to the air gap for the regulation thereof.

In an alternative embodiment the enclosure is floating on the body of liquid and its bottom surface is preferably blackened.

Apparatus for heat extraction and energy conversion may, of course, be provided in combination with the above-described apparatus in accordance with a preferred embodiment of the invention.

BRIEF DESCRIPTION OF THE DRAWINGS

The present invention will be understood and appreciated more fully from the following detailed description, taken in conjunction with the drawings in which:

FIG. 7 is a side view, sectional illustration of a raft enclosure useful in the embodiment of FIG. 6;

FIG. 8 is a sectional illustration of an assembled raft according to an alternative embodiment of the present invention;

FIG. 10 is a pictorial illustration of an insulation module constructed and operative in accordance with a preferred embodiment of the present invention;

FIGS. 11A, 11B and 11C are enlarged illustrations of portions of the insulation module of FIG. 10;

FIG. 15A is a pictorial illustration of an insulation module constructed and operative in accordance with an alternative preferred embodiment of the present invention;

FIG. 15B is an enlarged illustration of part of the module of FIG. 15A;

FIG. 16 is a pictorial illustration of an insulation module constructed and operative in accordance with a further preferred embodiment of the present invention.

DETAILED DESCRIPTION OF THE INVENTION

Figure 1:
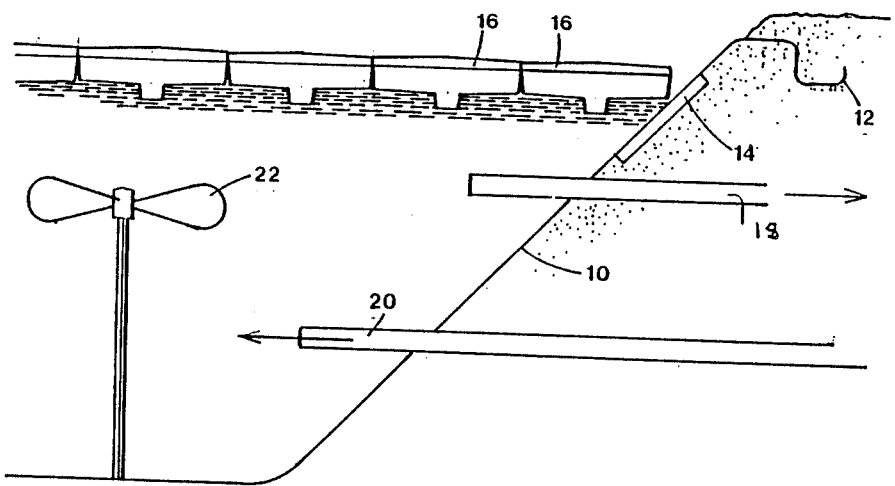
FIG. 1 is a sectional illustration of a solar pond covered with insulative rafts constructed and operative in accordance with an alternative embodiment of the present invention.

Reference is now made to FIG. 1 which illustrates a solar pond constructed and operative in accordance with a preferred embodiment of the present invention. The solar pond comprises a pond liner 10 which encloses the pond from the bottom and sides and is peripherally anchored in the surrounding earth by an anchor 12. A peripheral thermal insulating side surface layer 14 is provided adjacent the top surface of the pond as illustrated.

The solar pond comprises typically non-saline water and its surface is covered with an array of modular insulating raft assemblies 16, the construction of which will be described in detail hereinafter. It is a particular feature of the present invention that the pond can employ any type of water or other fluid. A heater water outlet conduit 18 communicates with the interior of the pond near its top surface for removing heated water therefrom for external use. A return water supply conduit 20 typically communicates with the interior of the pond at a slightly lower level.

According to a preferred embodiment of the present invention, mixer means 22, typically in the form of one or more rotating impellers or suitably directed water jets, are provided in the pond for providing a generally homogeneous temperature layer of water at high temperature adjacent the surface of the pond. This layer is relatively stable against heat losses due to convection from adjacent layers of water lying therebelow.

Reference in now made to FIG. 7 which illustrates the construction of raft assemblies 16. Raft assemblies 16 comprise a molded bottom assembly 24, which is typically formed of G.M.T., continuous glass fibre reinforced plastic such as Polypropylene, and has a generally rectangular configuration. The bottom assembly typically includes a bottom recess 26 which accomodates a weight 28 for providing raft stabilization. Extending upwardly and outwardly of the bottom recess is an inclined bottom wall 30 which terminates in peripheral side walls 32. Formed on side walls 32 is a peripheral lid support protrusion 34. It is noted that the bottom assembly, when fully assembled as part of the raft is designed to ride in the water such that the water line is located approximately at the bottom of the side walls 32, such that the insulating material located within the bottom assembly lies substantially above the water surface.

A lid member 36 is assembled onto the side wall 32 of the bottom assembly. The lid member 36 is formed with an inclined top surface 38 to provide drainage of rainwater and with a peripheral engagement clip configuration 40 which provides positive sealed engagement with the top of side walls 32 of the bottom assembly. The positive sealed engagement may be provided by a labyrinth seal configuration molded into the peripheral walls defining clip configuration 40 and/or into side walls 32. A bottom surface 42 is arranged to abut against protrusion 34 of side walls 32.

The lid member 36 is preferably formed of PMMA (PolyMethylMethacrylate), UV protected polycarbonate or glass by injection molding themoforming, or any other suitable technique. It is preferably characterized in that it is transparent to radiation in the solar spectrum. Preferably it has a low refractive index or is surface treated by conventional techniques to reduce reflectivity. It is preferably opaque to thermal infra-red radiation and displays high durability when exposed to sunlight and humidity.

As seen in FIG. 7, each of adjacent raft assemblies 16, contains insulation apparatus 50 of the type illustrated typically in FIG. 2 and described hereinbelow. A layer of a refluxing fluid, such as low molecular weight silicone oil may be provided within the sealed enclosures defined by raft assemblies 16, for coating the surfaces of the raft assemblies and of the insulating apparatus by refluxing to prevent surface deterioration of the surfaces which results in haze and consequent enery losses.

A layer 52 of oil, such as ordinary light machine oil, is located intermediate adjacent rafts and not therebeneath, in order to prevent evaporation of the interstices between adjacent rafts.

Figure 2:
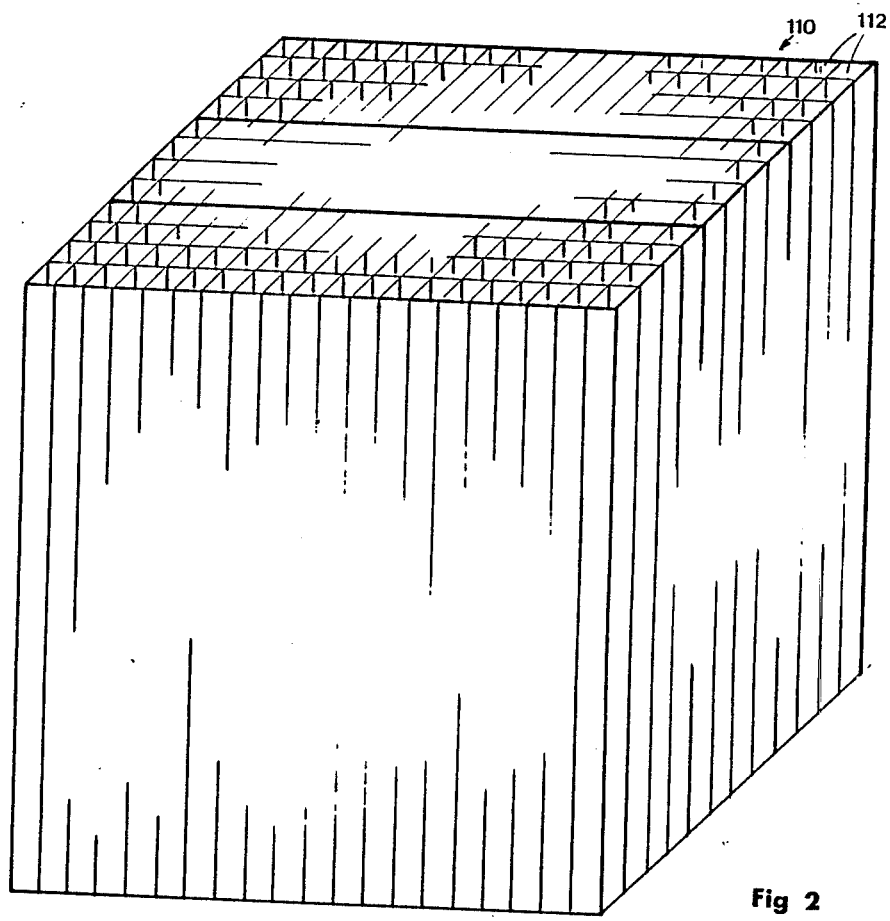
FIG. 2 is a pictorial illustration of solar radiation transmissive thermal insulation material constructed and operative in accordance with a preferred embodiment of the present invention.

Reference is now made to FIG. 2 which illustrates a solar energy transmissive thermal insulation material constructed and operative in accordance with a preferred embodiment of the present invention. The overall characteristics of the material are as follows:

1. Minimal absorption (i.e. less than about 20%) in the range of solar radiation, i.e. from approximately 0.3 to 2.0 microns.

2. High absorption (i.e. at least about 80%) in the range of thermal infra-red radiation, i.e. between approximately 6 to 25 microns.

3. Minimal reflectivity (i.e. less than approximately 20%) to incident diffuse radiation within the solar spectrum.

4. Low thermal convection and conduction heat losses (in the range of approximately 0.1–0.2 Watt/meter degree Centigrade or less).

According to a preferred embodiment of the present invention, the solar radiation transmissive thermal insulation material comprises an array 110 of cells 112 having a geometrical configuration which is selected to minimize both convection and conduction thermal losses. Within the context of a cell having a uniform cross sectional configuration, the geometrical configuration which minimizes conduction and convection may be appreciated to have an aspect ratio which is maximized against a cross sectional circumference which is minimized. The aspect ratio is defined as the ratio between the length (height) of the cell and its characteristic hydrodynamic cross sectional diameter. This characteristic hydrodynamic cross sectional diameter is a well known defined quantity for all common types of geometrical cross sectional shapes, such as squares, triangles, etc., and is equal to 4(area)/circumference.

According to a preferred embodiment of the present invention, cross sectional configurations having a high ratio of area to maximum separation between adjacent side walls are employed. Thus circular, hexagonal, triangular, and square cross sectional configurations are preferred over rectangular and other configurations, even though such configurations may be used nevertheless for reasons related to ease and economy of manufacture.

According to a preferred embodiment of the present invention, an aspect ratio of between 5 and 50 is preferred. The maximum separation between adjacent side walls is selected to minimize free convection through the cell under the temperature gradient conditions encountered during operation. The relationship between temperature gradient and the desired maximum separation between adjacent side walls for substantial prevention of free convection is described in *Heat Transmission*, by Walter N. McAdams, 3rd edition, McGraw Hill Book Company, at pages 170–182, especially pages 181–182.

In the present invention, the operational temperature gradients particularly for solar pond applications are expected to be in the range of 2–15 degrees centigrade/cm and thus the maximum separation between side walls of the cells is selected to be about 1 cm or less in order to limit the free convection losses to less than 1 Watt / square meter degree Centigrade.

It is appreciated that there exists a certain trade off in the determination of the thickness of the side walls of the cells 112 since the greater the wall thickness, the greater is the absorption of thermal infra-red radiation and the smaller the wall thickness, the smaller is the thermal conduction produced by the side walls. Accordingly, the thickness of the side walls is determined in order to minimize the overall energy losses due to back radiation in the thermal infra-red range and conduction through the cell walls. In the illustrated embodiment, a side wall thickness of approximately 10–50 microns is preferred on the basis of projections made by the inventors herein.

In the illustrated embodiment of the present invention, polycarbonate plastic is currently considered to be the best available material from a cost effectiveness standpoint. It is appreciated that other types of plastic materials such as polymethacrylates (perspex), thermoplastic polyesters, fluorocarbons (PVF, FEP, etc) in combination with appropriate additives, and polyacrylate or glass may also be used.

It is appreciated that the provision of a particularly smooth side wall surface for the cells is particularly important to maintain their solar radiation transmission efficiency. Since it is known that plastic surfaces tend to dry out over time as the result of prolonged exposure to intensive solar radiation and their surface tends to become cloudy, it is proposed to provide a small quantity of liquid within each cell. The liquid undergoes a continuous cycle of evaporation and condensation along the vertical temperature gradient and thus coats the side walls of the cells with a liquid coating preventing clouding thereof.

Figure 3:
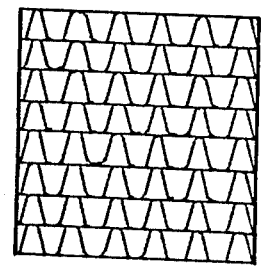
FIGS. 3 and 4 are sectional illustrations of two alternative embodiments of solar radiation transmissive thermal insulation material constructed and operative in accordance with a preferred embodiment of the present invention.

FIG. 3 illustrates a configuration of a cell array which is believed to be particularly easy and convenient to manufacture. FIG. 3 is a top sectional view and indicates that the individual cells are defined by the junctions between alternating flat and corrugated layers of plastic which are joined at their junctions to define the individual cells.

Figure 4:
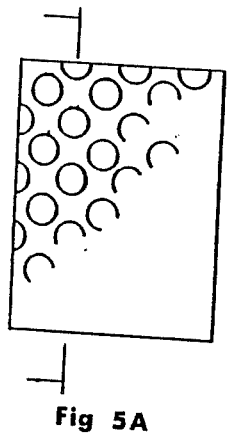
Figure 5A:
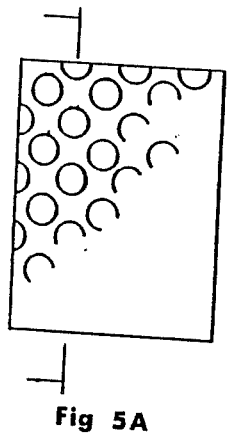
FIGS. 5A, 5B, and 5C are respective plan, sectional and side view illustrations of solar radiation transmissive thermal insulation material constructed and operative in accordance with an alternative embodiment of the present invention.
Figure 5B:
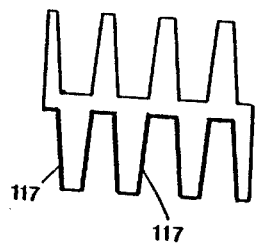
Figure 5C:
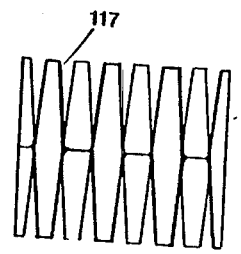

FIG. 4 illustrates an alternative configuration of a cell array which is made up of a multiplicity of tubes joined together in parallel orientation to define individual cells. FIGS. 5A, 5B, and 5C illustrate a further alternative configuration of a cell array which is comprised of a pair of nested surfaces of egg carton type configuration, each of which defines an array of spaced finger portions 117 which define the cells. The finger portions 117 of one such surface facing in a first direction are interdigitated with the finger portions 117 of a second such surface facing in an opposite direction whereby the finger portions 117 of one surface lie in the interstices between the finger portions 117 of the other surface.

Figure 6:
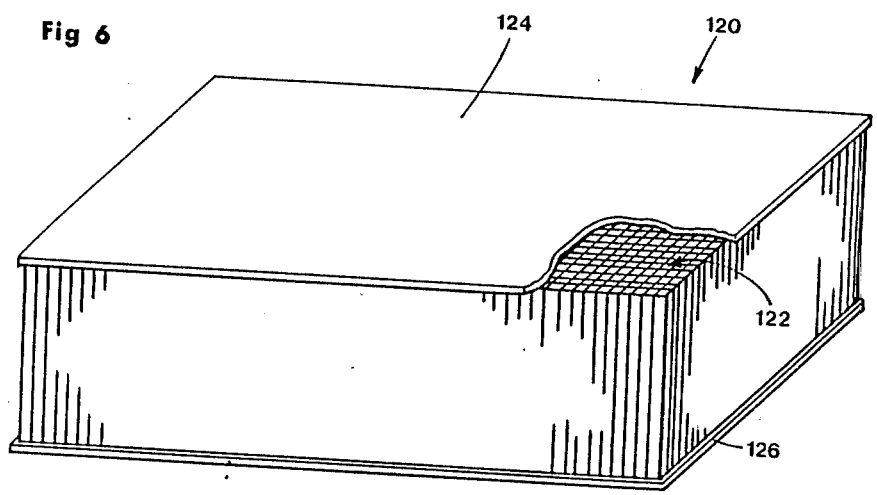
FIG. 6 is a pictorial illustration of a solar radiation transmissive thermal insulation module forming part of a solar pond in accordance with one embodiment of the present invention.

Reference is now made to FIG. 6 which illustrates a solar energy transmissive thermal insulating module 120 forming part of a solar pond constructed and operative in accordance with an embodiment of the present invention. The module 120 comprises an array 122 of the type illustrated in any of FIGS. 2–5C having sealed thereto top and bottom plates 124 and 126 to define a sealed unit which is adapted to float on the top surface of a body of water or to be seated on any other desired surface.

When module 120 forms part of an insulating top layer of a solar pond, it is a particular feature of the pond that the module in naturally oriented in a plane which lies tangent to the earth's surface at that location. Thus a maximal orientation of the cells with respect to the sum is provided.

Bottom plate 126 of module 120 may either comprise a transparent plate formed of the same material as the remainder of the module and the array or alternatively may comprise a solar energy absorbing plate and may be colored black accordingly. Top plate 124 is formed of a glazing material such as transparent plastic material which is preferably the same material as is used for the array 122.

It may be appreciated that the module of FIG. 6 has the following properties:

1. It is substantially transparent to solar radiation.
2. It is generally opaque to back radiation from the covered body of water in the infra-red band in the range of 6-20 microns.
3. It is generally resistant to liquid leakage and molecular diffusion therethrough.

According to a preferred embodiment of the present invention, a highly viscous liquid material may be provided on the surface of the solar pond in the interstices between the rafts. This liquid material layer provides damping of the motion of the rafts and also provides a vapor diffusion barrier at the interstices. Preferably the material should be translucent. A suitable mateial is polymethyl siloxane having a viscosity $10^3$–$10^4$ centistokes, low volatility and density less than unity.

Reference is now made briefly to FIG. 8, which illustrates an alternative preferred embodiment of the invention in which the module 120 is mounted on a plurality of sealed heat conductive tubes or other profiles 140, which provide buoyancy, while maintaining good thermal coupling between the module 120 and the underlying water. Profiles 140 are typically formed of aluminum or any other suitable corrosion resistant thermal conductor.

The structure of FIG. 8 is particularly suitable for pond constructions wherein ease of interconnection and stability of rafts is desired.

Figure 9:
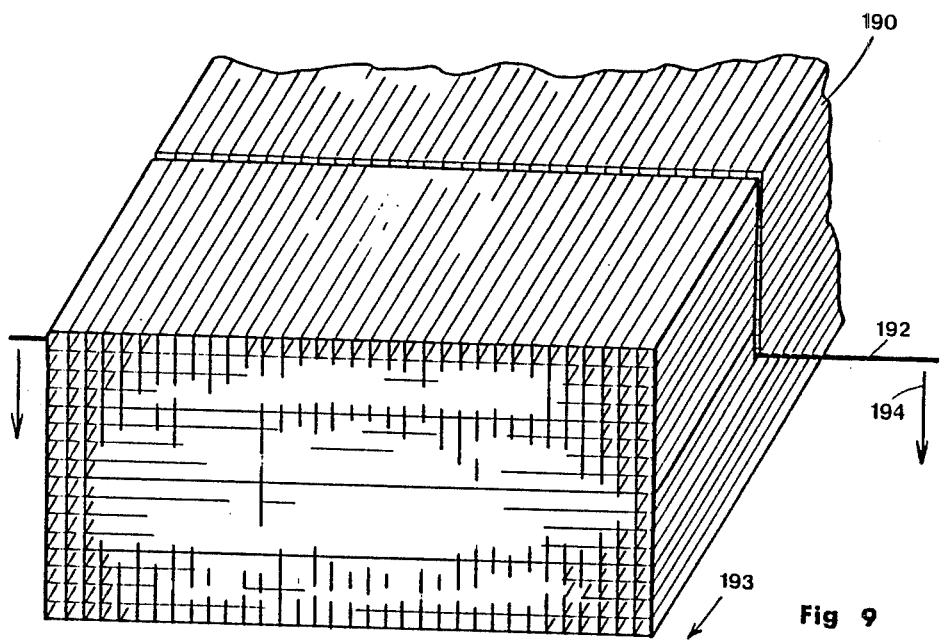
FIG. 9 is a pictorial illustration of the insulative material used in the embodiment of FIGS. 7 and 8 and illustrating a portion of the technique for manufacturing same.

Reference is now made to FIG. 9 which illustrates a technique for manufacture of the insulation apparatus of FIG. 2. As a first step, a multiple sheet hollow profile 190 is produced by extrusion from polycarbonate or other suitable material and cut into long slabs.

The slabs are then stacked and slightly pressed together to ensure contact between walls of adjacent slabs. A hot, thin metal wire 192, or series of such wires, is then driven through the stacked profiles in a direction 194 perpendicular to the direction 193 of extrusion and is operative to melt the plastic material at the contact surface with the following effects:

a. cutting through the stacks longitudinally along axis 194.

b. welding the adjacent edges of adjacent slabs together.

The cutting and welding steps may alternatively by performed by a suitable laser beam.

The result is a slice formed of a plurality of joined slabs, which slice is located within the sealed raft as described hereinabove.

The basic characteristics of the assembled raft assembly including the insulation aparatus are as follows:

Thermal stability up to about 100 degrees centigrade.

Mechanical and dimensional stabiility against accumulative shearing forces caused by wind up top 40 m/sec at 100 m fetch.

Floating stability notwithstanding waves, inhibition of waves or their formation.

Extremely low transmissivity of water vapor by diffusion in order to avoid interior accumulation of water by condensation.

The optical and other characteristics are already described hereinabove in connection with the description of the insulation material.

Reference is now made to FIGS. 10 and 11A in which are shown an insulation module 200, constructed according to a preferred embodiment of the present invention. The module 200 comprises a top planar rectangular surface 202, parallel to a similar bottom surface 203, rectangular side walls 204 which typically are mutually parallel and perpendicular to and disposed between the above-mentioned top and bottom surfaces and a pair of similar side walls 206, disposed bewteen and perpendicular to side walls 204.

In order to provide a water-tight seal to the module there is provided a sealing strip 208 located along all of its edges. Incorporated into sealing strip 208 are a plurality of vents 210.

Each vent 210, as shown in FIG. 11a is tube-like in section having a continuous passage 211, formed to have an exit 213 which is spaced above top surface 202 and exits into the atmosphere in a generally downward direction, so as to prevent the intrusion of rain water into module 200.

The function of vents 210 is to prevent the formation of high positive or negative pressures within module 200. If such pressures were allowed to build up, they would create conditions of fatigue within the module material within an unacceptably short period of time and would eventually lead to material failure and inefficient functioning of the module and the possible drawing inward of water from outside module 200.

It will be appreciated that module 200 has the following properties:

1. it is substantially transparent to solar radiation;
2. it is generally opaque to back radiation from the covered body of water in the infra-red band of 6-20 microns; and
3. it has additional properties as listed hereinabove with reference to FIG. 6.

Figure 11B:
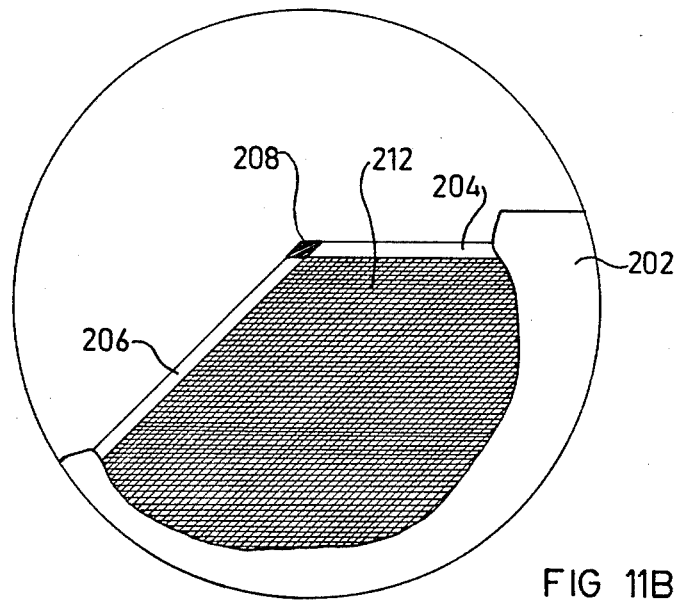
Figure 11C:
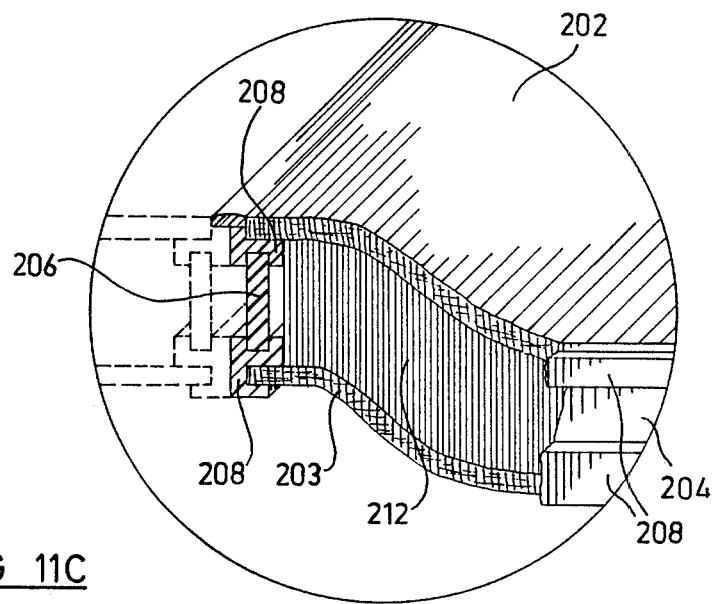

Reference is now made additionally to FIGS. 11B and 11C in which are shown enlarged views of the internal structure of insulation module 200. Shown in FIG. 11B and 11C is an array of cells 212. Each such cell is, as shown, typically square in plan and rectangular in section, typical dimensions being 4 mm×4 mm×100 mm. The manufacturing process for obtaining cell array 212 is substantially as described hereinabove with reference to FIG. 9.

Figure 12A:
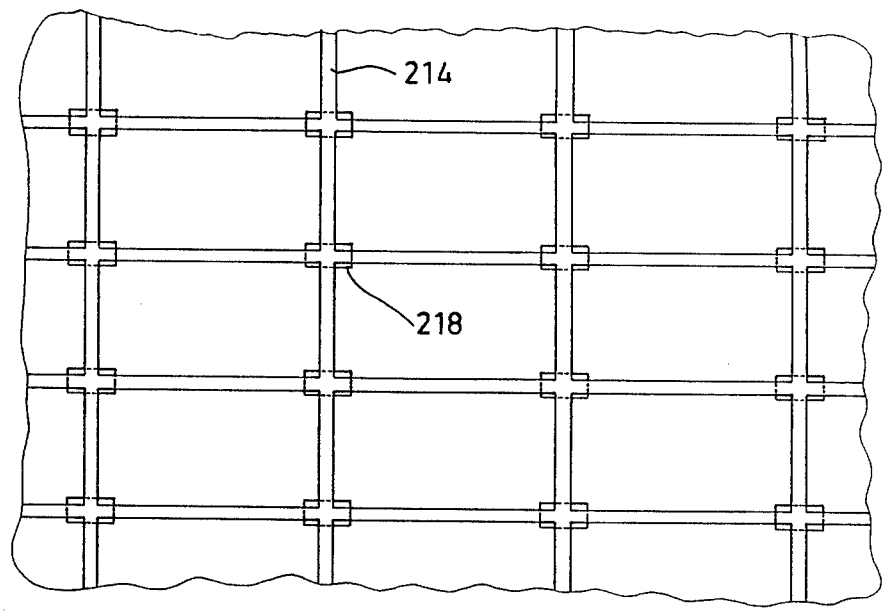
FIG. 12A is a top view illustration of a fixed mounting structure designed and operative in accordance with an embodiment of the present invention.
Figure 12B:
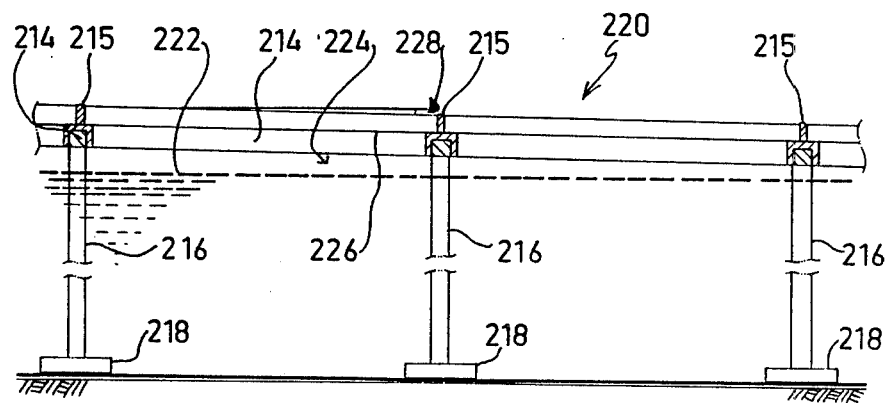
FIG. 12B is a side view illustration of insulation modules, mounted on the mounting structure of FIG. 12A.

In FIGS. 12A and 12B there is shown an embodiment of the present invention wherein a metal framework 214 is attached to substantially vertical fixed legs 216 which are further supported by foundation slabs 218, typically as shown. The frame work 214 and legs 216 may be of any suitable construction and material but are preferably made from an aluminum alloy which has suitable properties of strength, lightness, ductility and high resistance to corrosion.

An array 220 of insulation modules 200 (FIG. 10) is located on the supporting framework 214 with suitable sealing strips 215 located between modules.

Array 220 is located above the water level indicated by reference numeral 222 such that an air gap 224 is created between the array 220 and the water level 222.

The presence of air gap 224 serves to prevent scale on the bottom surface 226 of the array 220 which would otherwise occur were array 220 in contact with water. Hence air gap 224 maintains transparency of array 220 and in so doing ensures continued and efficient penetration of solar radiation to a depth typically of 1m in clear water. Air gap 224 serves additionally to insulate the body of liquid contained within the solar pond against heat losses.

It is desirable in accordance with an embodiment of the present invention to tint the water. The presence of a coloring agent in the water serves to regulate the depth of penetration of solar radiation and also to limit reflection of solar radiation off the water surface 222.

Also shown is an optionally provided incline of array 220 as indicated by reference numeral 228, typically in the order of 1%–2%. The provision of such an incline ensures the runoff of rain water and helps to prevent its uncontrolled incursion into the solar pond.

Figure 12C:
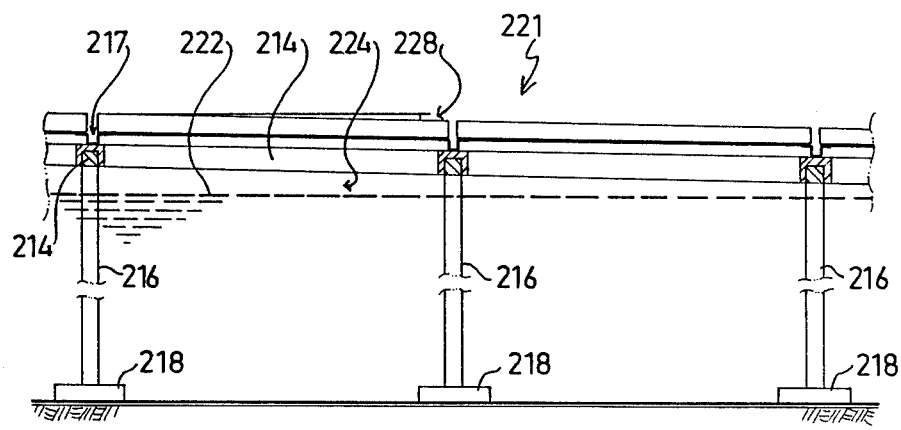
FIG. 12C is a side view illustration of insulation modules mounted on an alternative embodiment of the mounting structure of FIG. 12A.

Shown additionally in FIG. 12C is an alternative array 221 of insulation modules 200 (FIG. 10). Array 221 is indirectly located on supporting framework 214, being attached thereto by channel structure 217 and being supported on the edges thereof. Channel 217, serves to provide inter-module drainage, draining away any runoff that may be caused by rain.

Figure 13C:
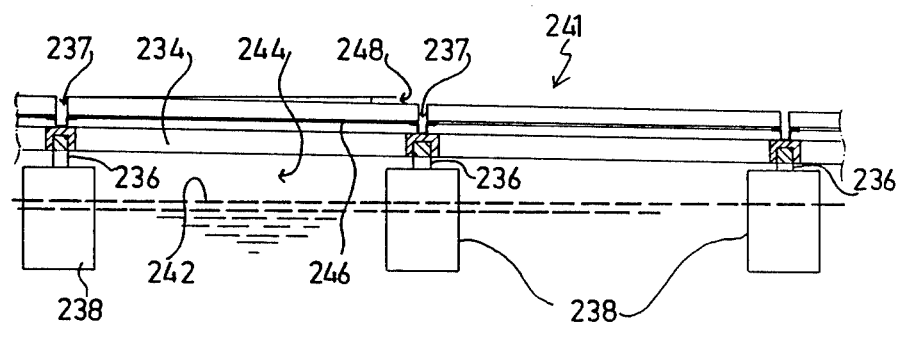
FIG. 13C is a side view illustration of insulation modules mounted on an alternative embodiment of the mounting structure of FIG. 13A.
Figure 13A:
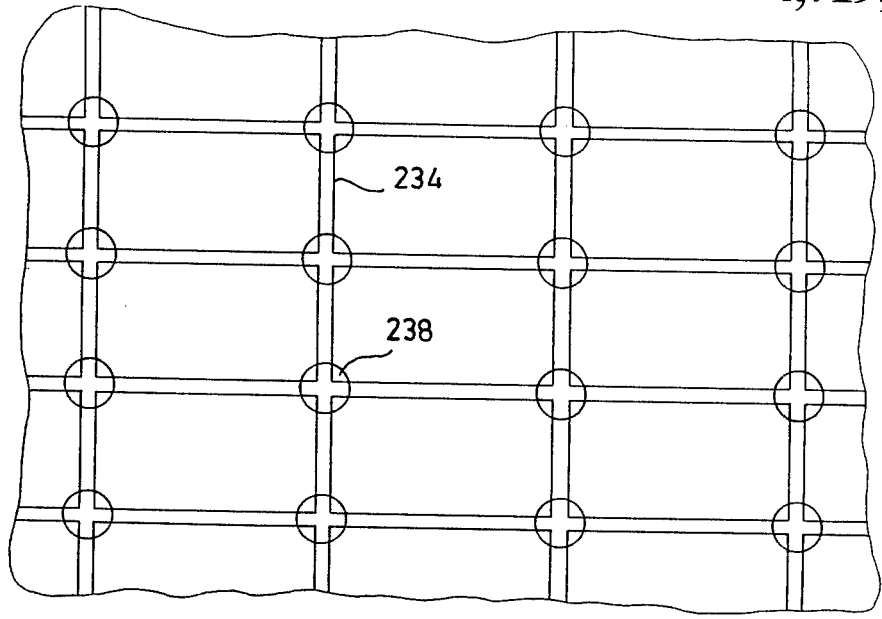
FIG. 13A is a top view illustration of a floating mounting structure floating on buoys designed and operative in accordance with an embodiment of the present invention.
Figure 13B:
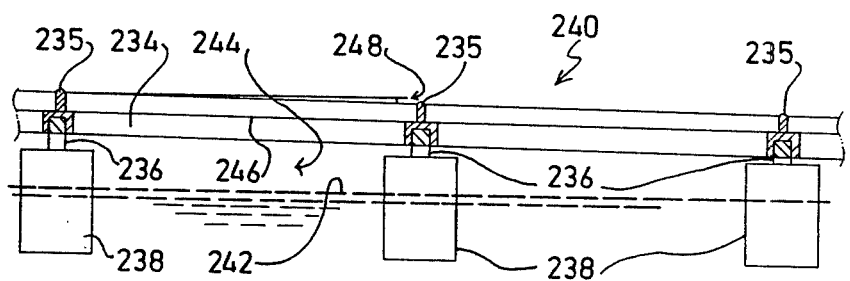
FIG. 13B is a side view illustration of insulation modules, mounted on the floating mounting structure of FIG. 13A.

In FIGS. 13A and 13B there is shown an embodiment of the present invention wherein a metal framework 234 is attached to and supported by floating byoys 238. Framework 234 may be attached directly to buoys 238 or indirectly thereto by short substantially vertical legs 236.

An array 240 of insulation modules 200 is disposed on the supporting framework 234 with suitable sealing strips 235 located between modules.

Array 240 is located above the water level 242 such that an air gap 244 is created between the array 240 and the water level 242.

It should be noted that the function of air gap 244 is generally similar to that of air gap 224 as described with reference to the embodiment of FIGS. 12A and 12B. Additionally, it is desirable to tint the water, as described also with reference to the embodiment of FIGS. 12A and 12B.

Also shown in FIG. 13B is an optionally provided incline of array 240 as indicated by reference numeral 248 and whose function is similar to that of the incline described with reference to the embodiment of FIGS. 12A and 12B.

Shown additionally in FIG. 13C is an alternative array 241 of insulation modules 200 (FIG. 10). Array 241 is indirectly located on supporting framework 234, being attached thereto by channel structure 237 and being supported on the edges thereof. Channel 237 serves to provide inter-module drainage, draining away any runoff that may be caused by rain.

Figure 13D:
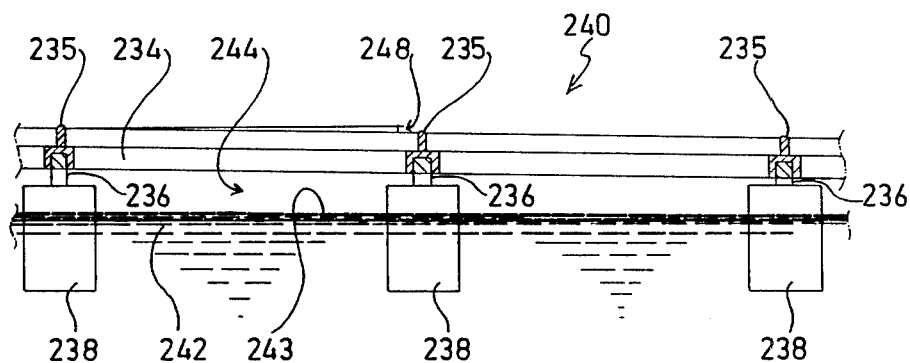
FIG. 13D is a side view illustration of insulation modules mounted on the floating mounting structure of FIG. 13B but where the pond material comprises of two mutually immiscible liquids.

In FIG. 13D there is shown an alternative embodiment of the present invention. Above water level 242 there is shown an additional layer 234 which is immiscible with water and the vapour pressure of which is lower than that of water. In accordance with an embodiment of the invention, layer 243 comprises a film forming material, typically, oil or cetyl alcohol.

Figure 14A:
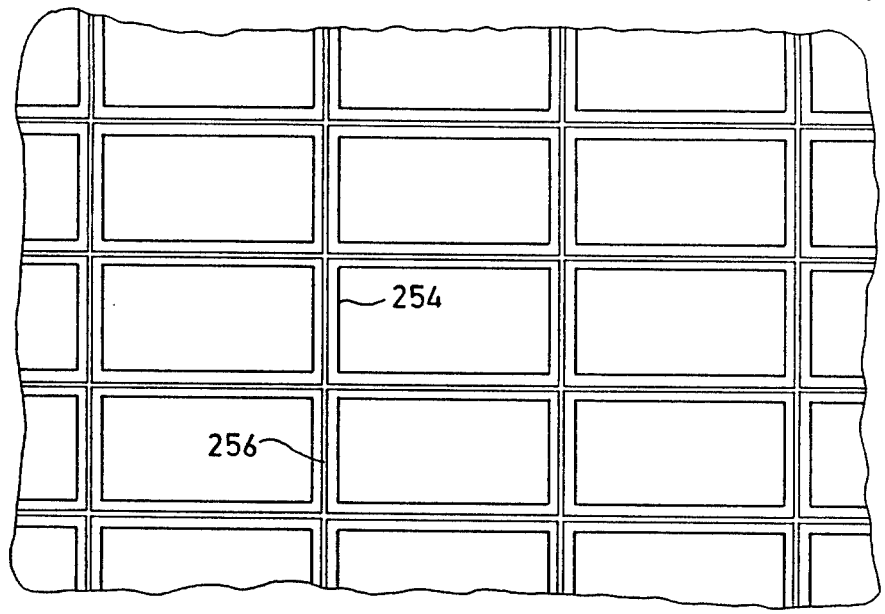
FIGS. 14A and 14B are respective top and side view illustrations of insulation modules mounted on floating tubular structures.
Figure 14B:
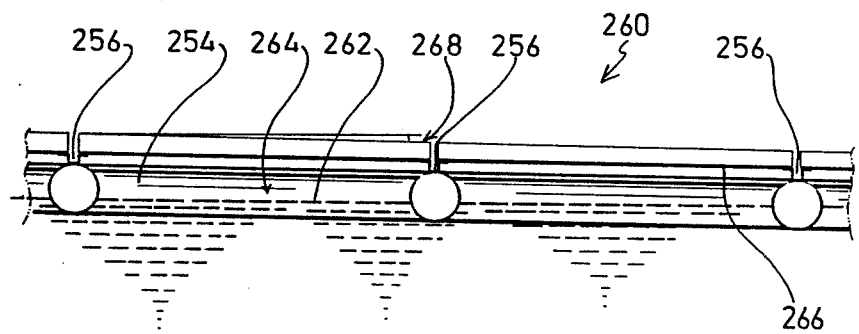

In FIGS. 14A and 14B there is shown an embodiment of the present invention wherein a sealed and substantially hollow framework 254 which is preferably tubular and formed of metal, floats directly on water surface 262. Framework 254 may additionally comprise a small drainage channel 256 upon the edge of which are located insulation modules 200 (FIG. 10) which make up an array 260 of such modules.

According to another embodiment, there is provided an array of insulation modules 260 disposed on the supporting framework 254 with suitable sealing strips located between modules 200.

Additionally, it is noted that array 260 is located above the water level 262 such that an air gap 264 is created between the array 260 and the water level 262.

It should be noted that the function of air gap 264 is generally similar to that of air gap 224 as described with reference to the embodiment of FIGS. 12A and 12B. Additionally, it is desirable to tint the water, as described also with reference to the embodiment of FIGS. 12A and 12B.

Also shown in FIG. 14B is an optionally provided incline of array 260 as indicated by reference numeral 268 and whose function is similar to that of the incline described with reference to the embodiment of FIGS. 12A and 12B.

With reference to FIG. 15A and 15B there is shown an insulation module 300 constructed according to an additional embodiment of the present invention. Module 300 is substantially the same as that shown and described with reference to FIGS. 10 and 11A and has similar characteristics and properties, except that in the present embodiment of the invention there are provided downwardly extending peripheral surfaces arranged to form a skirt shown by numeral 312 which extends below the enclosure whereby an air gap is defined by the bottom of the enclosure referenced 306, the body of liquid and the skirt 312.

Figure 15C:
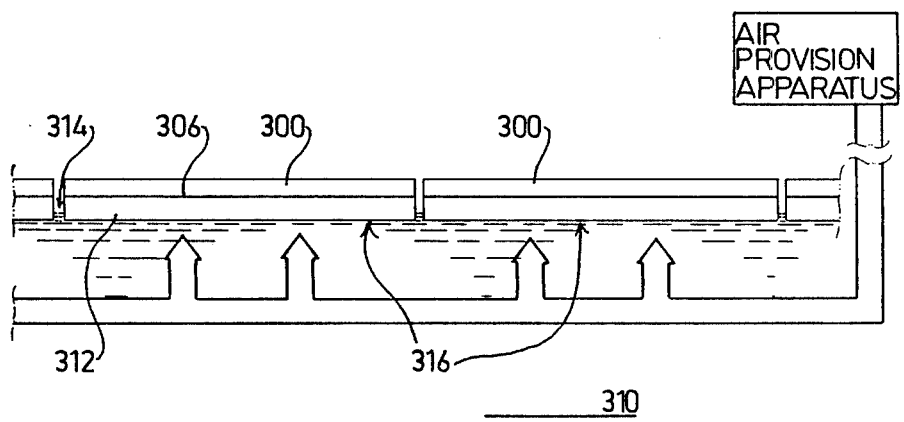
FIG. 15C is a side view illustration of the operation of the insulation modules of FIG. 15A.

With reference being made additionally to FIG. 15C, insulation modules 300 are located on body of liquid 310. Skirt 312 extends into the water to a point just below water surface 314 such that an air pocket 316 is formed between enclosure bottom surface 306 and water surface 314.

It should be noted that the function of air pocket 316 is generally similar to that of air gap 224 as described with reference to the embodiment of FIGS. 12A and 12B. Additionally, it is desirable to tint the water, as described also with reference to the embodiment of FIGS. 12A and 12B.

Indicated by reference numeral 318 there is additionally shown apparatus for the provision of air to air pockets 316 for the regulation thereof. Apparatus 318 may comprise any suitable air pump or other air provision means.

Shown in FIG. 16 is an insulation module indicated by numeral 400, designed and constructed in accordance with an additional embodiment of the present invention. There was shown in FIGS. 10, 11A, 11B and 11C an insulation moduel 200, the internal structure of which comprises an array of cells 212 substantially vertical in section. Insulation module 400 comprises an internal structure comprising an array of cells 412, which are diagonal in section.

A measure of the efficiency of the insulation apparatus of the present invention may be made by comparison of the longitudinal axis through each of the cells comprised in array 412 with an angle of incidence of the sun. When the angle of incidence of the sun is coincident with that of the longitudinal axis of cells constituting array 412 then there is a minimum of diffusion of the sun's rays and more solar energy reaches the body of liquid in the provided solar pond.

In regions where the maximum angle of incidence of the sun is significantly below 90 degrees, the insulation apparatus embodied in the present invention will have increased efficiency if an angled array 412 is used.

It should be noted that all other characteristics of module 400 are substantially the same as those described hereinabove with regard to FIGS. 10, 11A, 11B and 11C, and that it may be used in any of the preferred embodiments of the present invention hereinabove described.

It should additionally be noted that techniques for manufacture of array 412 are substantially the same as those hereinabove described with reference to FIG. 9, except that in order to obtain an array of slanted cells, the described stacked slabs are cut at a preselected angle and not as described therein.

It will be appreciated by persons skilled in the art that the invention is not limited by what has been particularly shown and described hereinabove. Rather the scope of the present invention is defined only by the claims which follow.

We claim:

1. A solar pond comprising a body of liquid material sought to be heated, a layer of solar spectrum radiation transmissive insulation arranged to lie over said body of liquid material in a non-contact spaced relationship therwith so as to form an air gap therebetween, wherein said layer of solar spectrum radiation transmissive insulation comprises an array of cells generally transmissive to solar spectrum radiation and generally opaque to thermal radiation, the array being surrounded by a generally sealed enclosure comprising planar glass panels defining top, bottom and side surfaces and being joined by sealing means, said enclosure including venting apparatus for permitting communication between the interior and exterior of the enclosure, each of said cells in said array having a uniform non-rectangular planar cross section and an aspect ratio which is selected from a range between 5 and 50 to minimize free convection therethrough, the insulation apparatus being configured such that only a single layer of cells is disposed between the liquid material sought to be heated and the sun, said non-contact spaced relationship being provided by a fixed support secured to the bottom of said solar pond for mounting said solar radiation transmissive insulation thereon, said air gap minimizing scale buildup on said enclosure bottom surface and providing insulation against heat loss from the pond.

2. A solar pond according to claim 1 wherein said array of cells comprises a plurality of elongated slanted cells.

* * * * *